United States Patent [19]
Miller et al.

[11] Patent Number: 5,454,272
[45] Date of Patent: Oct. 3, 1995

[54] CABLE TENSIONING DEVICE

[75] Inventors: Mark F. Miller, Billings, Mont.; Allan G. Burk; Andrew H. Stewart, both of Fort Collins, Colo.

[73] Assignee: IHS Engineering, Inc., Billings, Mont.

[21] Appl. No.: 192,435

[22] Filed: Feb. 7, 1994

[51] Int. Cl.⁶ ........................................................ G01L 5/00
[52] U.S. Cl. ................................. 73/862.41; 73/862.391
[58] Field of Search ..................... 73/862.391, 862.41, 73/158; 340/669; 364/508

[56] References Cited

U.S. PATENT DOCUMENTS

| | | |
|---|---|---|
| 4,158,962 | 6/1979 | Conoval . |
| 4,376,368 | 3/1983 | Wilson . |
| 4,379,226 | 4/1983 | Sichling et al. ............... 73/DIG. 1 |
| 4,565,099 | 1/1986 | Arnold . |
| 4,833,928 | 5/1989 | Luukkala et al. ............... 73/862.39 |
| 4,914,960 | 4/1990 | Kordahi . |
| 4,960,001 | 10/1990 | Vemmer . |
| 4,979,125 | 12/1990 | Kwun et al. . |

FOREIGN PATENT DOCUMENTS

3203815  8/1983  Germany ........................ G01L 5/04

Primary Examiner—Richard E. Chilcot, Jr.
Assistant Examiner—Ronald L. Biegel
Attorney, Agent, or Firm—Oldham, Oldham & Wilson Co.

[57] ABSTRACT

A non-destructive method for tensioning a cable under tension is described whereby the cable is contacted with an impact stimulus with a force transverse to the length of the cable thereby creating an incident vibrational wave in the cable and propagating the wave along the length of the cable. The propagating wave is sensed by a first accelerometer positioned on the cable which detects the passage and amplitude of the wave and creates electrical signals having a magnitude directly proportional to the amplitude of the wave. A second accelerometer which is positioned at a distance apart from the first accelerometer subsequently senses and detects the passage of the wave at the second accelerometer, also creating electrical signals having a magnitude directly proportional to the amplitude of the wave. The electrical signals from the accelerometers are received and processed to ultimately calculate the tension in the cable.

8 Claims, 13 Drawing Sheets

CABLE TENSIONING DEVICE

TECHNICAL FIELD

The invention described herein pertains generally to a device that utilizes vibrational wave analysis to directly determine the tension in a cable.

BACKGROUND OF THE INVENTION

When sagging cable between structures, it is critical that the installation conform to engineered sag charts. Thermal contraction, combined with icing and wind, can pull down towers or poles if the cable is not sagged properly. Current methods of checking sag are: (1) optical survey; (2) visual approximation; (3) dynamometer; and (4) return wave timing.

While each of these techniques are used under various circumstances, they are all subject to limitations. The optical survey technique is labor intensive, the visual and return wave timing are subject to inaccuracies, primarily due to operator inexperience and human error, and the dynamometer has gained limited acceptance in the field.

The principal of measuring sag or tension of a conductor by means of wave timing has long been recognized. A mechanical wave initiated near one support will travel to the next support, reflect back, and pass back and forth repeatedly between supports. The sag of the conductor can be determined by timing the wave returns in seconds, and converting the measured value of time to sag with the following equation:

$$Sag = 48.3 \left( \frac{t}{2n} \right)^2 \quad [1]$$

where sag is measured in inches, t is the time in seconds for a generated wave to return to the point of origin, and n is the number of return waves counted. The tension in a conductor is proportional to the velocity of a mechanical wave propagating along the conductor as given in the following equation:

$$T = \frac{V^2 \mu}{g_c} \quad [2]$$

where T is line tension measured in lbs, V is mechanical wave velocity (ft/sec), $\mu$ is the unit weight of the conductor ($lb_m$/ft), and $g_c$ is the gravitational constant (32.2 $lb_m$–ft/$lb_f$–$sec^2$). The fundamental mechanics equation for calculating conductor sag is:

$$Sag_{ft} = \frac{\mu L^2}{8 T_0} \quad [3]$$

where L is the span in feet, and $T_O$ is the conductor tension at midspan ($lb_f$). By combining equations [2] and [3] and allowing for only one return wave, the following equation is derived, identical to equation [1], except for the units for sag:

$$Sag_{ft} = 1.0063 t^2 \quad [4]$$

While it is possible to calculate the sag, or tension if the span is known, by measuring the time taken by a mechanical wave to propagate down the full span and back, this approach has several disadvantages. One disadvantage is the level of impact required for a measurable wave to propagate along larger conductors. This is a well-known problem with the return wave method on large conductors with long spans and one of the problems addressed by this invention. Another disadvantage is the unknown effects that conductor attachment/end-fixity may have on the propagating wave, end fixity referring to the wave dampening and phase shifts in the wave resulting in the transducers not being able to detect the return wave accurately or reliably.

From the brief discussion of the prior art, it can be seen that there is still a need for a reliable and accurate method and device to calculate cable sag with a minimum of operator intervention.

SUMMARY OF THE INVENTION

In accordance with the present invention, there is provided a device which analyzes generated mechanical waves to determine the tension in a cable.

It is an object of this invention to provide a device which can be utilized during construction of tensioned cabling or after the installation for inspection and maintenance purposes.

It is another object of this invention to induce a mechanical wave on the conductor triggered by the user and then measure the vibrational characteristics of the induced wave.

It is yet another object of this invention to provide a quick connect/disconnect application to allow for the rapid setup and dismantling on an energized or de-energized conductor.

It is still yet another object of this invention to permit the microprocessor device to operate in a wide range of environmental conditions.

These and other objects of this invention will be evident when viewed in light of the drawings, detailed description, and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 10 is a graph of actual vs. predicted tension using #4

ACSR cable (6" impact distance, no filtering at various accelerometer spacing);

DETAILED DESCRIPTION OF THE INVENTION

Referring now to the drawings wherein the showings are for purposes of illustrating the preferred embodiment of the invention only and not for purposes of limiting the same, the Figures show a process for cable tensioning and necessary vibrational sag tensioning monitoring devices, which permit the accurate and reliable determination of sag in a cable or conductor with a minimal amount of operator intervention. In the discussion, the words cable and/or conductor will be used interchangeably, the invention being equally applicable to situations where electricity is being transported through a wire and those where the cable is non-conductive or semi-conductive.

The best mode for carrying out the invention will now be described for the purposes of illustrating the best mode known to the applicant at the time. The examples are illustrative only and not meant to limit the invention, as measured by the scope and spirit of the claims.

Figure 1:
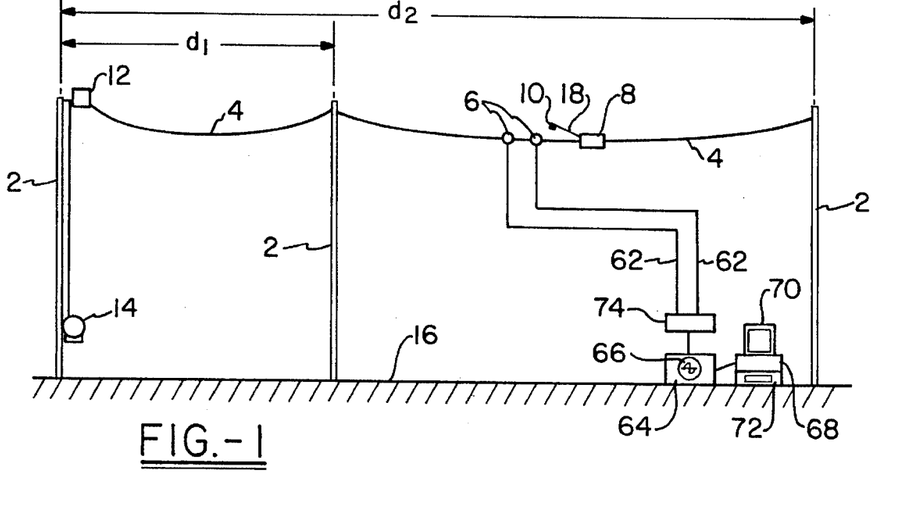
FIG. 1 is side plan view of the experimental sonic sag tensioner setup consisting of a winch system, with a load cell attachment, mounted on a pole for adjusting and monitoring conductor tension.
Figure 7:
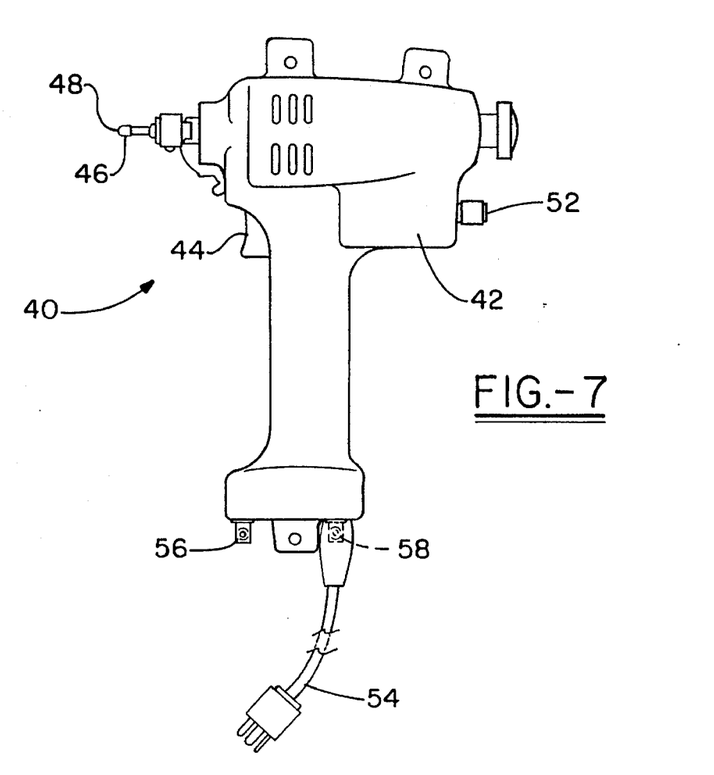
FIG. 7 is a side view of an impactor.

FIG. 1 shows a laboratory setup consisting of a winch system 14, with a load cell 12 attachment, mounted on a pole 2 for adjusting and monitoring conductor 4 tension. Two additional poles 2 were set to obtain spans of 116 ft ($d_1$) and 300 ft ($d_2$) to which a pair of accelerometers 6 with output leads 62, and an impactor 8 were attached. The output 62 from accelerometers 6 was first passed through an analog to digital converter 74 which was then displayed on an oscilloscope 74 and optionally could be transferred to a microprocessor 68 with screen display 70 and keyboard 72. Microprocessor 68 optionally interfaced with impactor 8, particularly as shown in FIG. 7, for remote control activation (not shown).

Four tests were used during the study as shown in Table I. In the table, the abbreviations ACSR refers to "Aluminum Conductor Steel Reinforced", and the designations #4, #2, 3/0 and 636 refer to wire size and are standard to the industry.

TABLE I

| Expt. Nbr. | Size | Type | Diameter (in) | Unit Weight (lb/ft) |
|---|---|---|---|---|
| 1 | #4 | ACSR | 0.250 | 0.0574 |
| 2 | #2 | ACSR | 0.316 | 0.0913 |
| 3 | 3/0 | ACSR | 0.502 | 0.2308 |
| 4 | 636 | Aluminum | –0.930 | 0.5969 |

(A) Excitation

Figure 5:
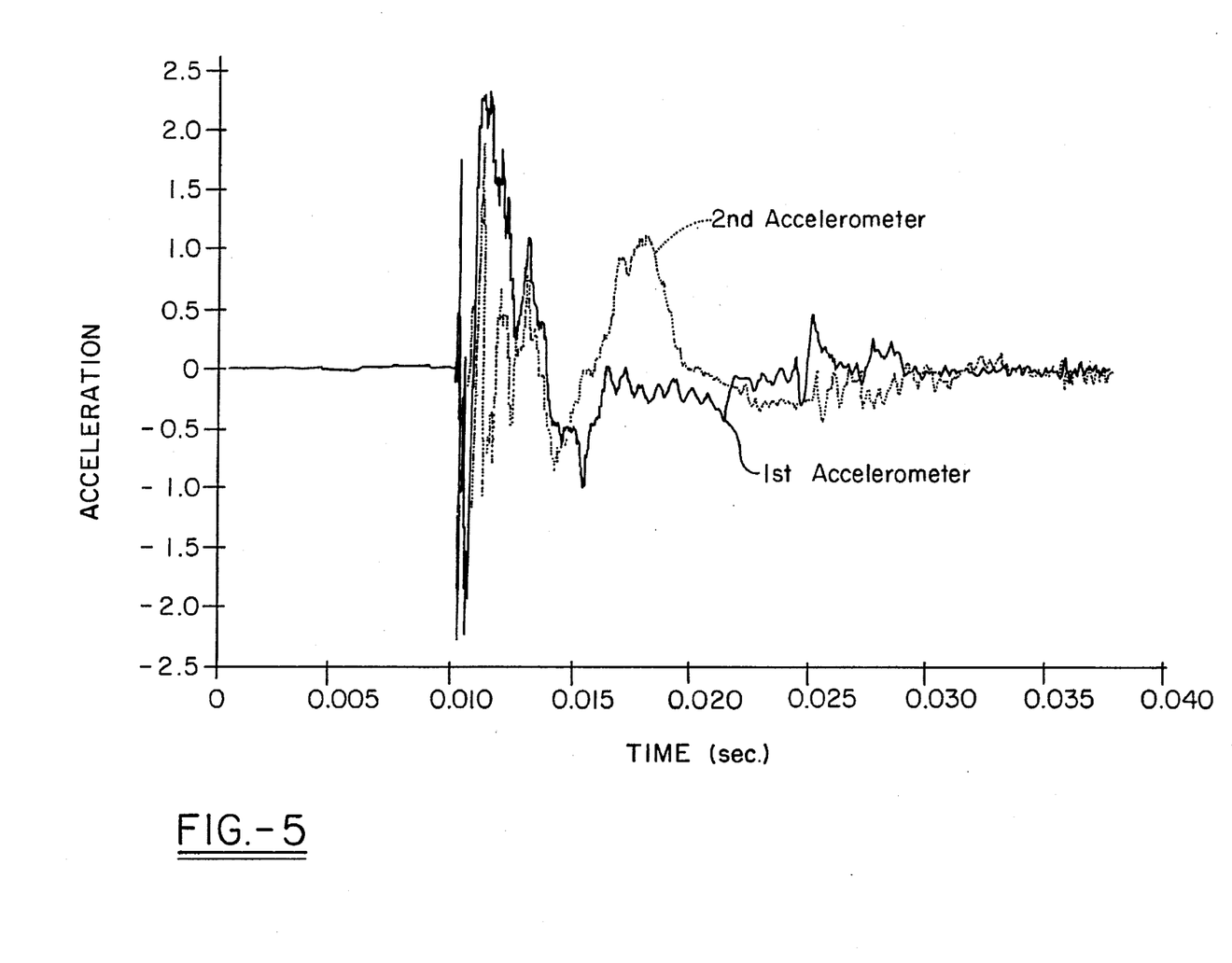
FIG. 5 is a graph of time (seconds) vs. acceleration with hammer impact.

Considerable effort was dedicated to identifying an acceptable impact system. Initial evaluations consisted of striking the conductor with hammers of various hardness. In most cases, the acceleration vs. time records consisted of multi-frequency waves resulting in a very "noisy" time record. Thus, as shown in FIG. 5, it is difficult to determine when the mechanical wave passes the accelerometer with any degree of accuracy producing inconsistent detection times. When a propagating wave passes by an accelerometer, one would expect a very smooth curve with a well defined peak as the output from the accelerometer. If the record is noisy, the output is not smooth, and the peak is difficult to detect, and may not be repeatable.

Even when the time records were filtered such as through digitally filtering the data with frequencies below and/or above given thresholds removed from the data, to eliminate undesirable frequency components of the time record, accuracy was still inconsistent due to the variability of the impact level.

Figures 4, 6:
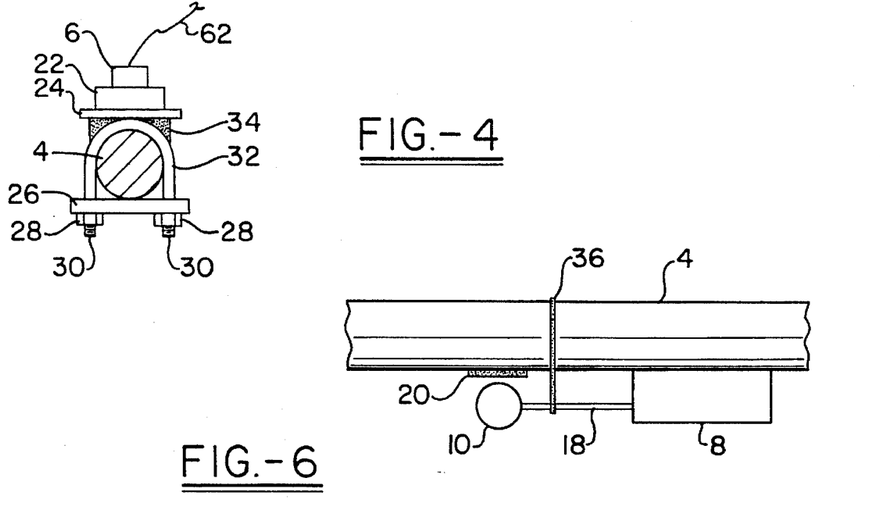
FIG. 4 is a front plan view, shown in partial cross-section, of an accelerometer clamp mount shown attached around the cable.
FIG. 6 is a side plan view of a bottom-mounted pendulum impactor.
Figure 8:
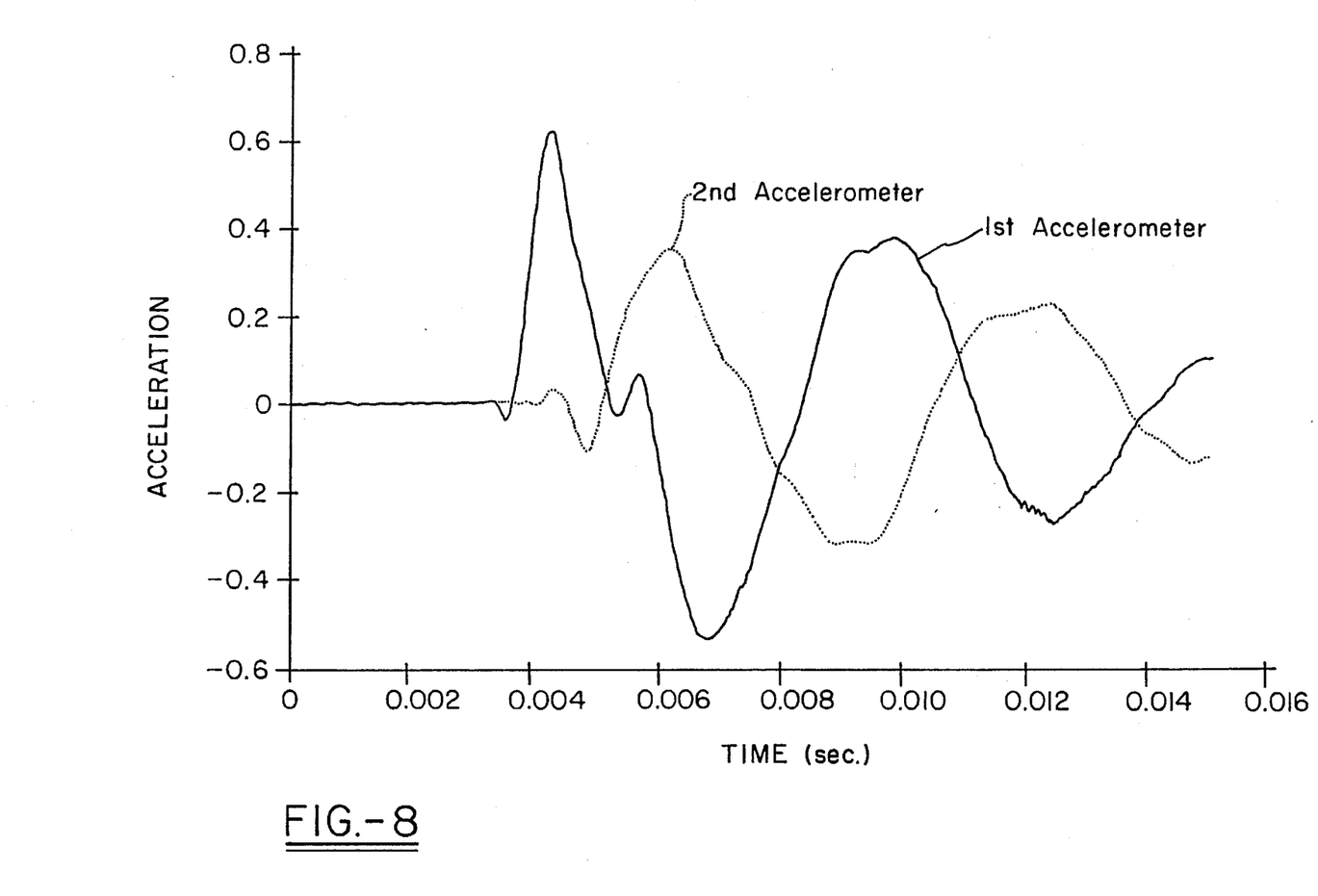
FIG. 8 is a graph of time (seconds) vs. acceleration with pendulum impact.

One method for excitation is shown in FIG. 6 wherein a pendulum apparatus was developed for attachment to the conductor 4. The pendulum was mounted on the bottom of the conductor so it would strike the conductor once, then fall away. Highly elastomeric rubbers 36, (e.g., rubber bands), were attached to the attachment rod 18 and conductor 4 to provide the impact force. A rubber pad 20 was also mounted to the conductor 4 to eliminate high frequency components in the time records. As illustrated in FIG. 8, the time records were greatly improved, in terms of less noisy signals, from when the conductor was struck with a hammer.

The disadvantage of the pendulum system, was the inability to obtain impacts with consistent energy levels. While this system represents an improvement over for example, the hammer impact system, consistency still depended on the elasticity of the rubber band. Additionally, the pendulum base had to be hand-held to stabilize the system while delivering the impact.

Figure 2:
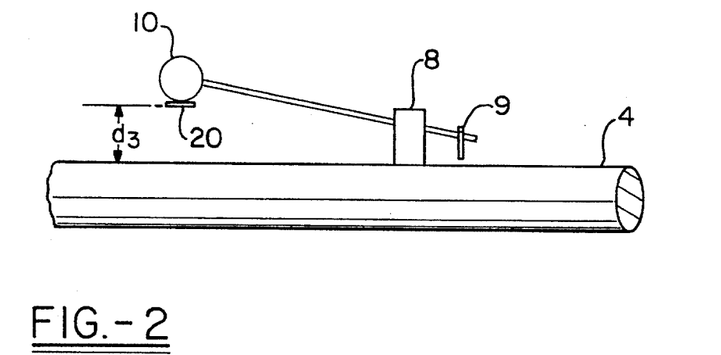
FIG. 2 is a side plan view of a top-mounted pendulum impactor.

In a more preferred embodiment, the pendulum 10 was further modified so it is mounted on top of the conductor 4, as shown in FIG. 2. A set screw 9 was installed so the pendulum consistently dropped from a predetermined height. Additionally, the rubber pad 20 was glued to the pendulum. This system resulted in very consistent impacts. For the #4, #2, and 3/0 conductors, a pendulum drop height of 3 inches was sufficient to induce a mechanical wave. However, for the 636 conductor, the pendulum was not sufficient for inducing a consistently detectable mechanical wave.

As seen in Table I, the simple pendulum system was sufficient to induce a mechanical wave in relative small conductors, such as #4, #2, and 3/0 ASCR conductors. The pendulum 10 weighed approximately 60 grams and the drop height ($d_3$) was ~3 inches. While a pendulum arrangement works acceptably with smaller gauge conductors, it is ineffective as the conductor diameter increases. The use of heavier pendulums caused undesirable conductor vibration due to the heavy swinging mass, thereby reducing the accuracy in predicting conductor tension.

Therefore, for larger diameter conductors, an electric impactor is preferred for inducing a mechanical wave. The impactor is a hand-held device with a solenoid plunger. It is held at a fixed distance above the conductor. Thus, the plunger is the only mechanism which contacts the conductor. The impactor successfully delivers consistent mechanical waves, even in the 636 conductor.

One example of an electrical impactor is shown in FIG. 7. The impactor 40 contains a housing 42, trigger 44, impact tips 48 and gages 46. The impact force of the impactor is adjusted by use of force adjustment knob 50 and amplifier gain switch 52. Indicator lights 54 indicate if the unit has a fault on impact, with other various lights indicating the degree of overload. In a preferred embodiment, the impactor is battery powered, but could be plugged into a generator via ac power cord 54. An external trigger BNC jack 56 is provided for triggering, or firing the unit remotely instead of using the built in trigger 44. In essence, a switch can be hooked up to the BNC jack and the unit will fire when the switch is closed. A signal output BNC jack 58 receives the output signal, and a microprocessor or other device could be connected to this jack to record the output from the force. The impactor will additionally have conductor skin temperature sensing capabilities via known techniques in the art (e.g., thermocouples).

(B) Type of Sensor

At least two types of sensors (transducers) 6 can be used for detecting a generated mechanical wave: (1) velocity-based geophones; and (2) accelerometers. While both types are able to detect the mechanical wave, geophones are much larger and heavier than the accelerometers and, thus in a preferred embodiment, accelerometers are preferred. While being listed for illustrative purposes only, one suitable accelerometer is a Series 3000 accelerometer manufactured by Colombia Research Laboratories, Inc., Woodlyn, Pa.

Several attachment methods are possible with accelerometers. The accelerometers can be mounted to clips, which in turn, are clamped onto the conductor. This method is unreliable for several reasons. In some cases, the placement of the screw head (mounting the accelerometer to the clip), was directly on top of a conductor strand. In other cases, it fell between conductor strands. Other reasons include the relatively long length of the clips (1–2") and the semi-rigid attachment for the accelerometer. In the clip system, the screw head transfers the energy to the accelerometer, whereas a rigid flat, mounting plate is desired. Ideally, a knife edge attachment would be used to identify exactly when the wave passes as opposed to some averaging effects with the longer clips. Thus, consistent accelerometer placement is difficult using this method.

Figure 3:
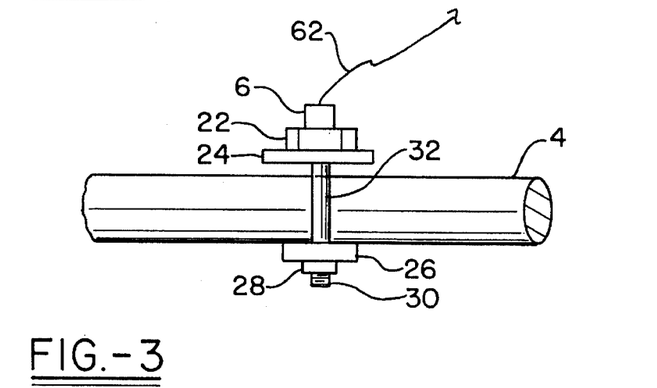
FIG. 3 is a side plan view of an accelerometer clamp mount shown attached around the cable.

FIGS. 3-4 show a preferred embodiment, wherein U-shaped cable clamps are used. A flat plate 24 is welded to the clamp 32 which now provides a rigid base 22 for mounting the accelerometers 6. The clamp is securely fastened to conductor cable 4 by retaining plate 26 through which the threaded ends of U-clamp 32 protrude and to which are fastened nuts 28. As seen in FIG. 4, the diameter of U-clamp 32 is such so as to snugly position itself about the diameter of cable 4. With this fastening method, the clamp is positioned independently of the location of conductor strands.

(C) Accelerometer Spacing

Figure 9:
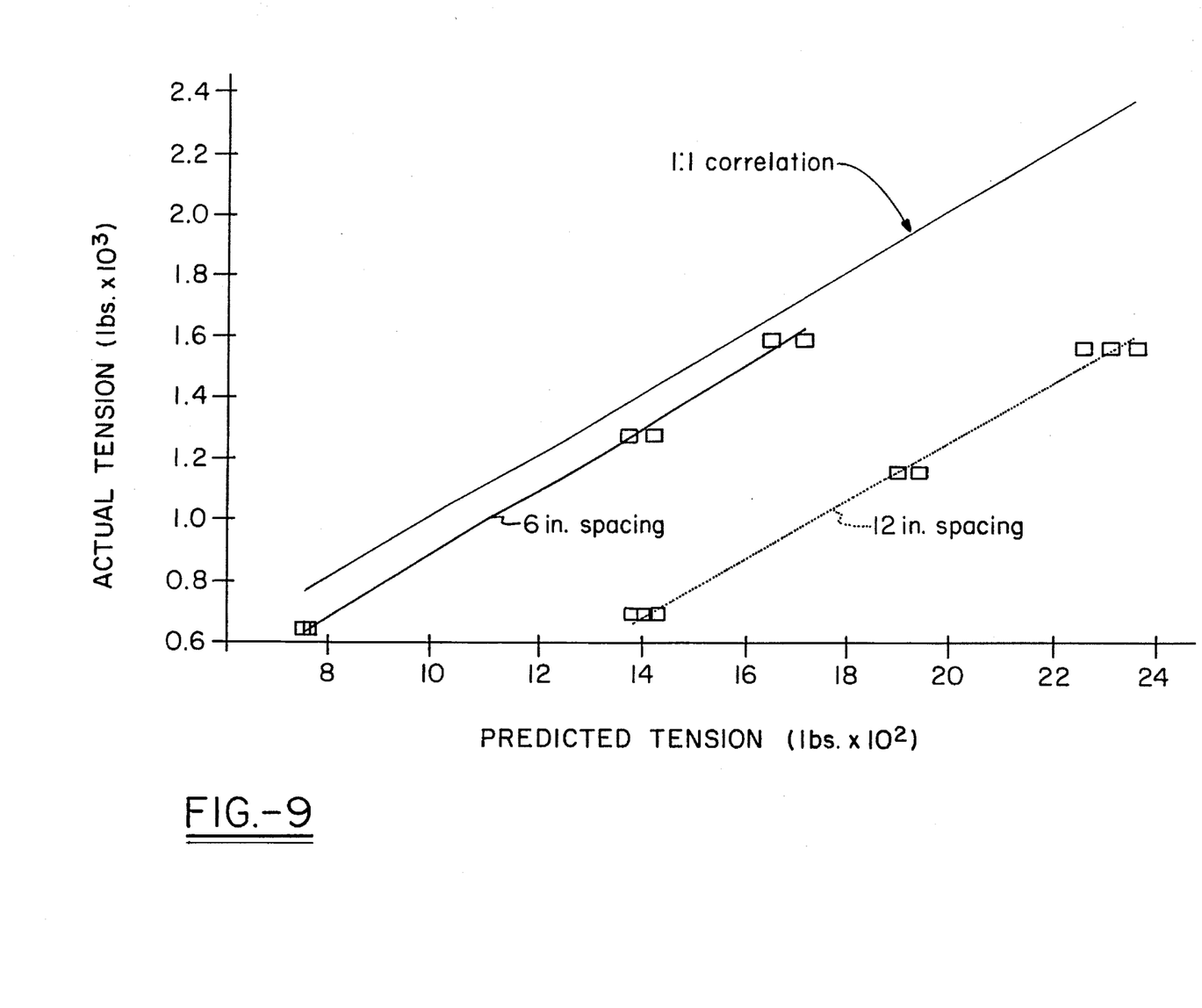
FIG. 9 is a graph of actual vs. predicted tension using 3/0 ACSR cable (6" impact distance)
Figure 10:
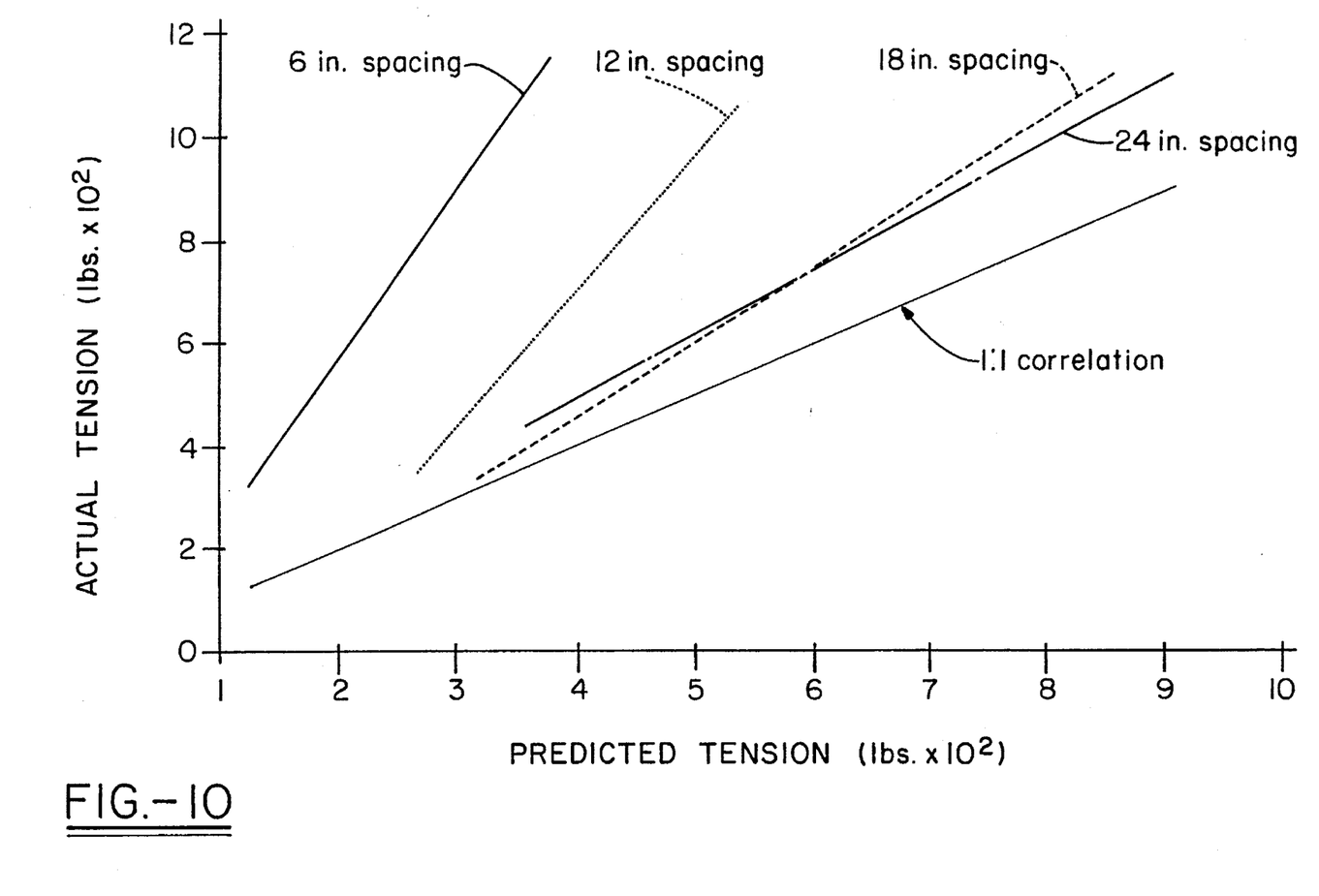
Figure 11:
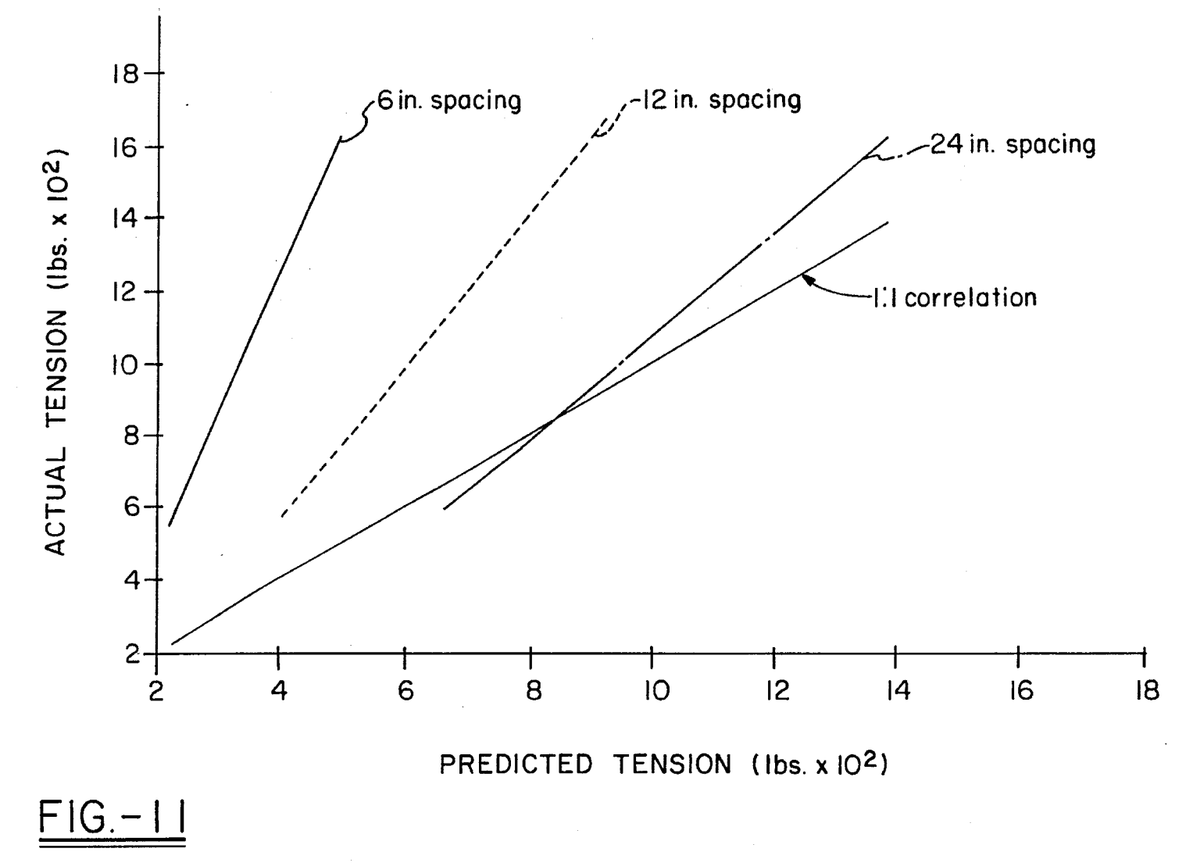
FIG. 11 is a graph of actual vs. predicted tension using #2 ACSR cable (6" impact distance, no filtering at various accelerometer spacing)
Figure 12:
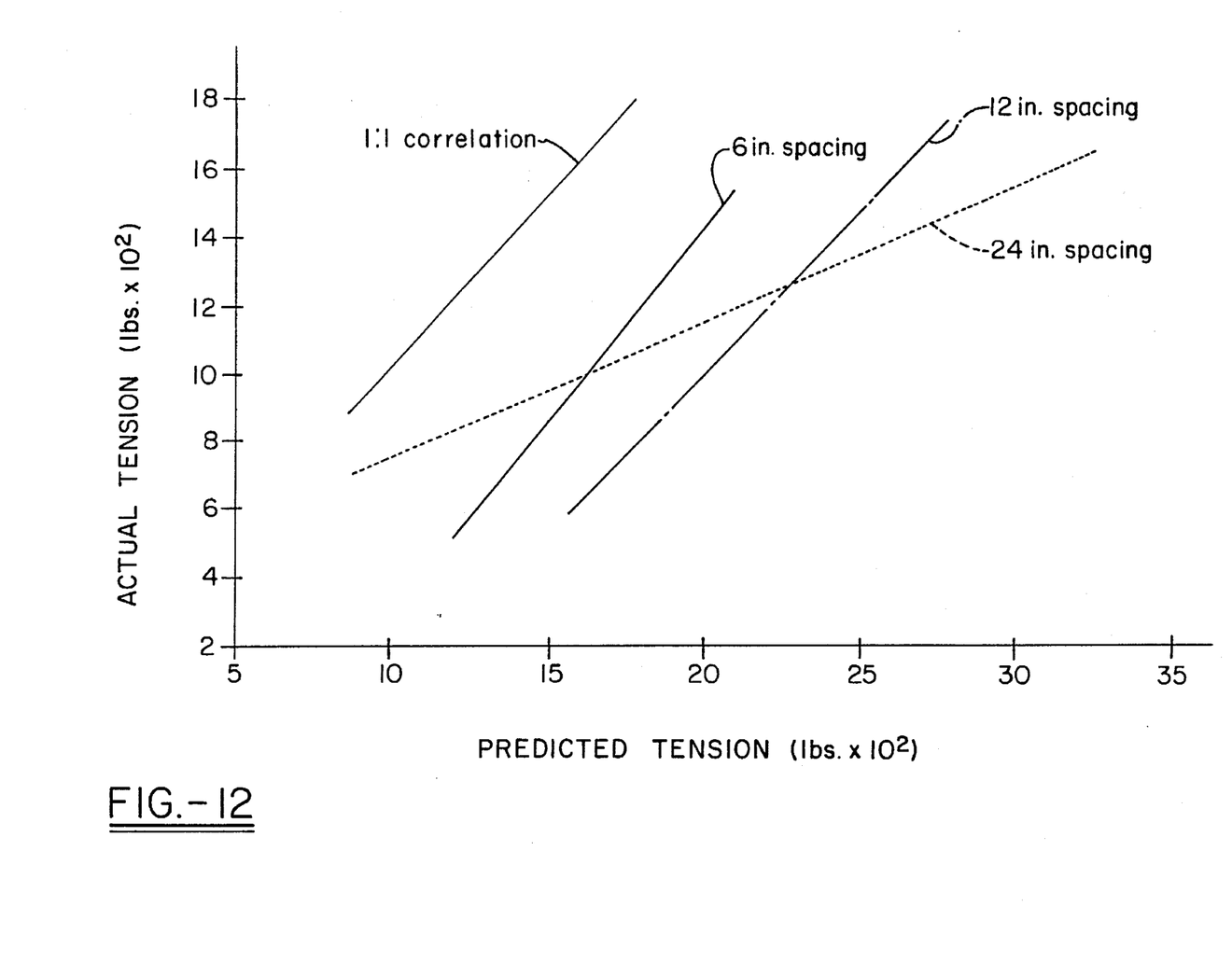
FIG. 12 is a graph of actual vs. predicted tension using 3/0 ACSR cable (6" impact distance, no filtering at various accelerometer spacing)
Figure 13:
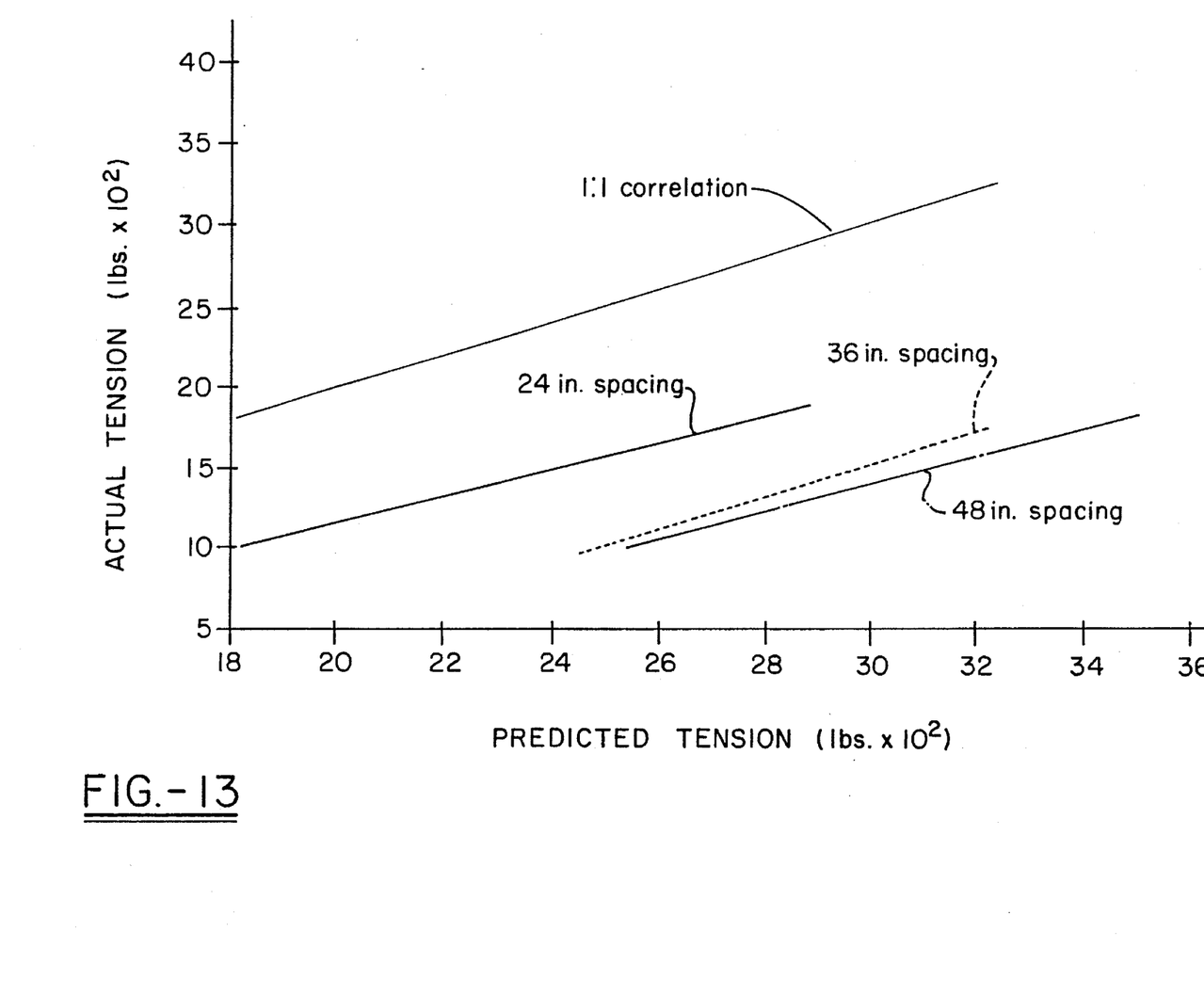
FIG. 13 is a graph of actual vs. predicted tension using 636 cable (24" impact distance, no filtering at various accelerometer spacing using an electric impactor)

The relationship of actual conductor tension to predicted tension is linear for a given accelerometer spacing, as shown in FIG. 9. However, these relationships change as accelerometer spacing is changed.

Relationships of actual tension to predicted tension are shown in FIGS. 10– 13 for the #4, #2, 3/0 and 636 conductors respectively. The relationships were developed by collecting data at various tensions, and accelerometer spacings. For FIGS. 10–13, a 300 ft span was used for #2, 3/0 and 636 conductors, while the #4 was tested using a 116 ft. span. The 636 conductor was also tested with 5 and 10 ft accelerometer spacings.

The predicted tensions in FIGS. 10–13 were calculated using Eq. 2. The velocity component in Eq. 2 was calculated by dividing the accelerometer spacing by the length of time it took for the mechanical wave to pass between the two accelerometers. Referring back to the time record shown in FIG. 8, the time of travel can be calculated by measuring the time difference between the maximum peaks for accelerometers 1 and 2, respectively.

By the use of two sensors and by recording the time taken by the propagating wave to pass between the sensors, the wave velocity can be calculated by the previously provided equations. While one accelerometer could have been used and the time taken by the propagating wave measured when traveling the full span and returning to the point of origin, this approach is not desirable because of end-fixity and the required magnitude of the wave necessary for measuring the velocity. The selection of a dual accelerometer configuration preferentially over a single accelerometer allows the placement of the sonic sag tensioner on any conductor of any span length anywhere on the span and will permit the calculation of tension using only a very small generated signal.

The degree of fixity, or rigidity of an attachment point for a vibrating wire is critical to the reflection of waves propagating along the wire. A perfectly rigid attachment point will reflect the wave such that the amplitude of the wave is the same as the incident wave and the phase of the reflected wave is exactly shifted by $\pi$ radians. However, if the attachment is not perfectly rigid, the amplitude and phase of the reflected wave will be changed from these ideal conditions.

It has long been recognized that counting return waves from a fixed end over time will give the necessary data to calculate the tension in a line. In its most rudimentary sense, a wave can be generated by a simple jerking on the conductor at one end of a span and timing the third return wave that reflects from the other end. However, this approach has limitations, whether the method is automated or not, due to conductor size and span length. The single accelerometer is only effective on a span where there are no discontinuities, such as splices, dampers and deadened terminations.

Using one accelerometer, the wave velocity is determined by measuring the amount of time taken by a wave to propagate down the span and back. If the attachment point at the insulators was not rigid, complications arose in calculating wave velocity due to phase changes in the wave. An additional problem with this approach was that the amplitude of the return wave was typically reduced or at least damped, thereby making detection difficult.

The dual accelerometer configuration permits the use of a much smaller signal to perform the calculations, thus span lengths and conductor sizes are no longer a limitation, and as long as there are no discontinuities between the two sensors, it can be used on any span and at any place in the span.

Other methods for measuring time of travel were also evaluated. One approach consisted of integrating the acceleration curves to obtain velocity curves, then obtaining time of flight from the velocity peak-to-peak. Other methods included establishing threshold values, such as 40% of the peak, as the point of interest. An additional method used cross-correlation, where the curves were shifted along the time axis until the "best fit" was achieved. None of these methods resulted in any improvement over the dual accelerometer detection methodology.

Figure 14:
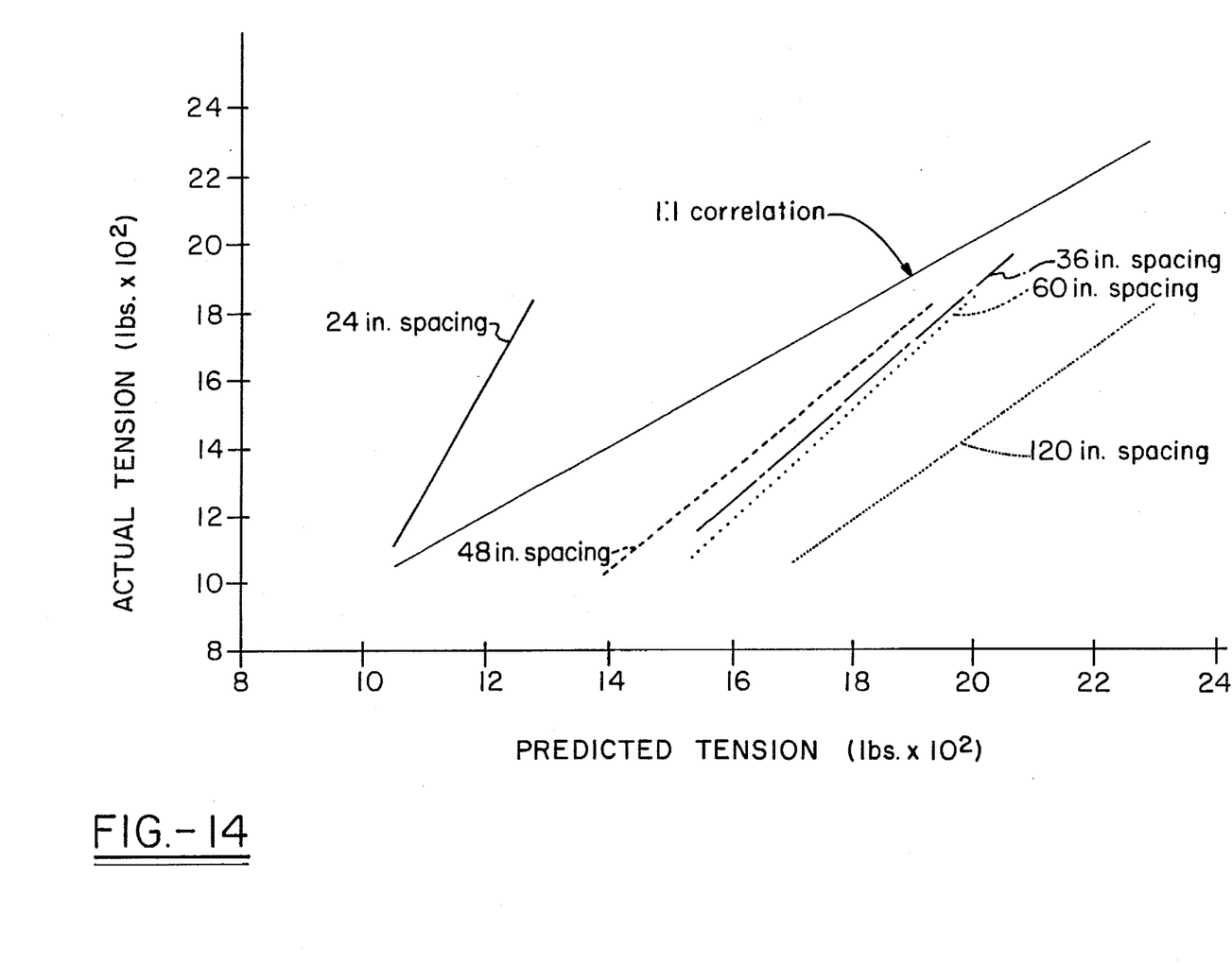
FIG. 14 is a graph of actual vs. predicted tension using 636 cable (24" impact distance, 0–70 Hz filtering, at various accelerometer spacing using an electric impactor)

For dispersive wave propagation, as the wave propagates, the frequency components separate, causing the wave front to widen and eventually form multiple peaks. An attempt to minimize the dispersive propagation was made by filtering the high frequency components in the time records. While this tended to improve the linearity of the relationships, it did not eliminate the effects of accelerometer spacing. The results of filtering are shown for the 636 conductor in FIG. 14. The predicted tensions for the 5 and 10 ft spacings were extremely high without filtering, while after filtering, the calculated tension values are closer to the expected values.

Figure 15:
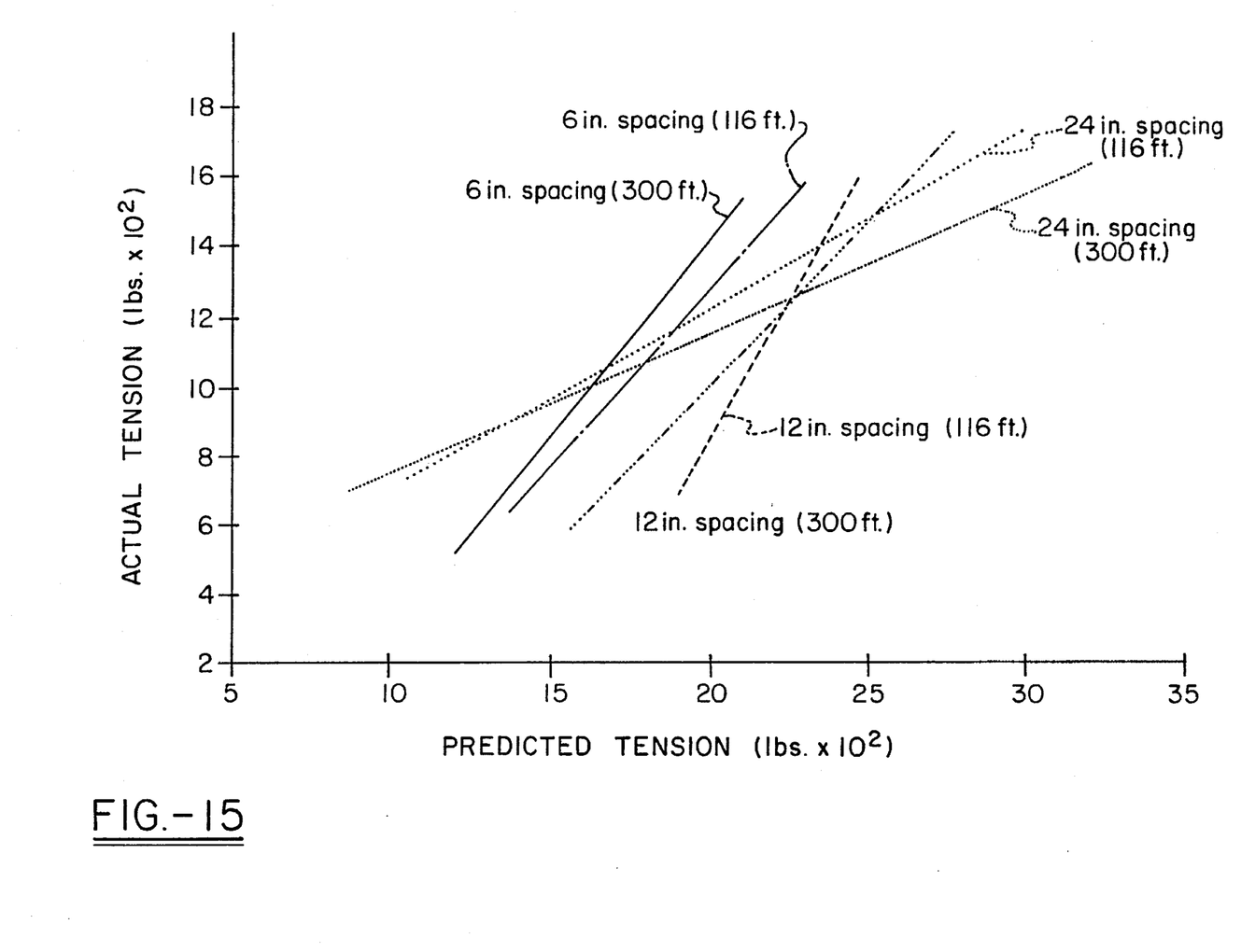
FIG. 15 is a graph of actual vs. predicted tension using 3/0 ACSR cable (at various impact distances, no filtering, at two span lengths)

The effects of span on predicted tension were evaluated for the 3/0 conductor. As shown in FIG. 15, there does not appear to be a span effect since the predicted relationships for the 116 ft and 300 ft spans are quite similar. The offsets in the curves, for a given accelerometer spacing, may be due to inaccuracies in measuring accelerometer spacing. A device with a fixed accelerometer spacing would be required to thoroughly evaluate span effects, however, it is anticipated that any effects will be negligible.

Figure 16:
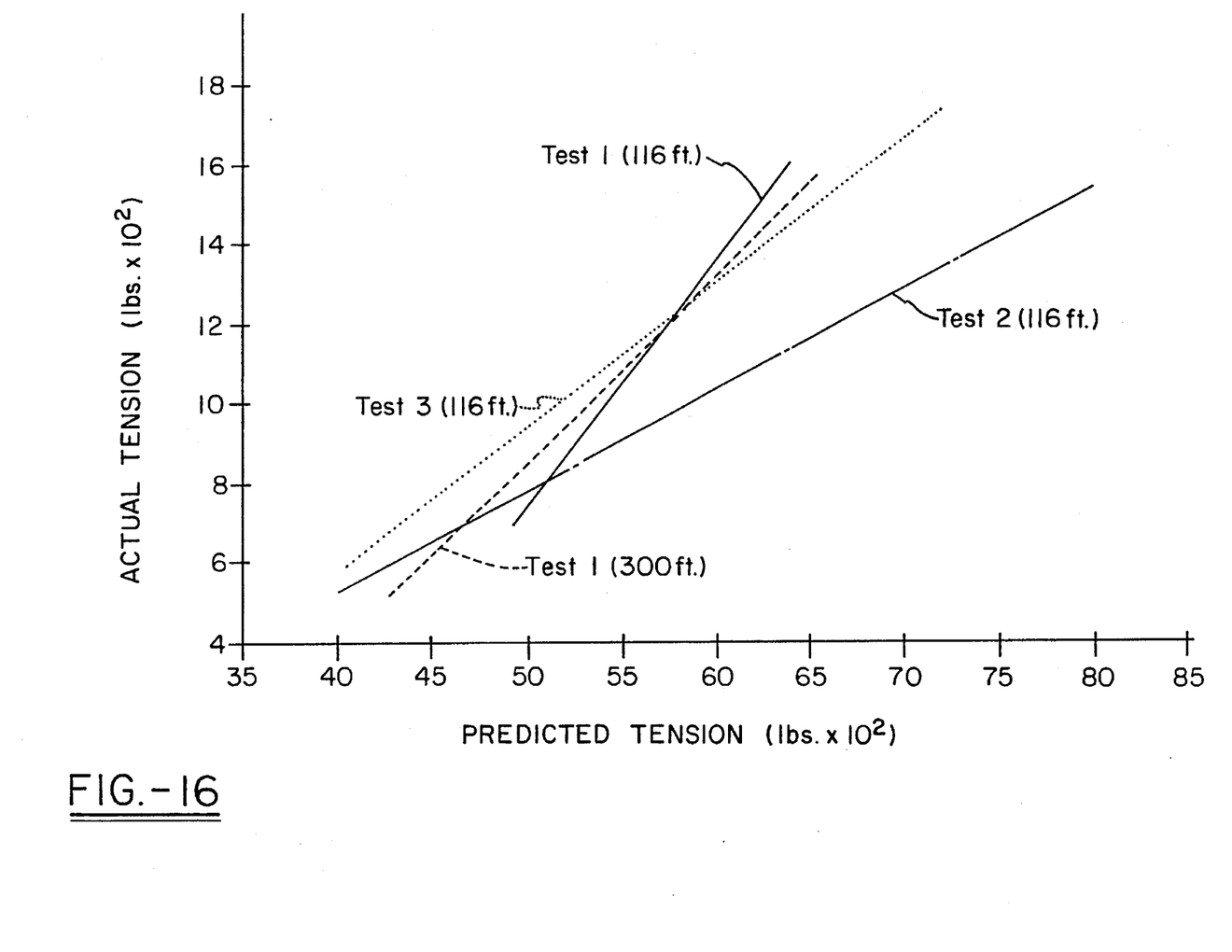
FIG. 16 is a graph of actual vs. predicted tension using 3/0 ACSR cable (at 12" accelerometer spacing, 6" impact distance, no filtering, at two span lengths)

Repeatability of the laboratory results is demonstrated for the 3/0 conductor with a 12 inch accelerometer spacing in FIG. 16.

The previous figures indicate that the device is not able to directly evaluate conductor tension. Errors for calculated tensions ranged from 2% to 200%. However, once a regression relationship was established for a given accelerometer spacing, the errors were greatly reduced and repeatability was improved. Table 2 presents error ranges for the four conductors with varying accelerometer spacings. In general, with a 12" accelerometer spacing on the ACSR conductors, the errors range was approximately ±5%. Errors of ±10% were obtained for the #4 conductor. Error ranges for the 636 conductor were ±1% with an accelerometer spacing of 5 ft.

TABLE 2

| Accelerometer spacing | #4[1] | #2[1] | 3/0[1] | 636[2] |
|---|---|---|---|---|
| 6" | ±17% | ±19% | ±1% | |
| 12" | ±10% | ±2% | ±2% | |
| 24" | ±10% | ±2% | ±15% | ±13% |
| 36" | ±9% | | | |
| 48" | ±4% | | | |
| 60" | | | | |
| 120" | ±1% | | | |

[1]Unfiltered, 6" impact distance
[2]0–70 Hz filtered, 2' impact distance?

Figure 17:
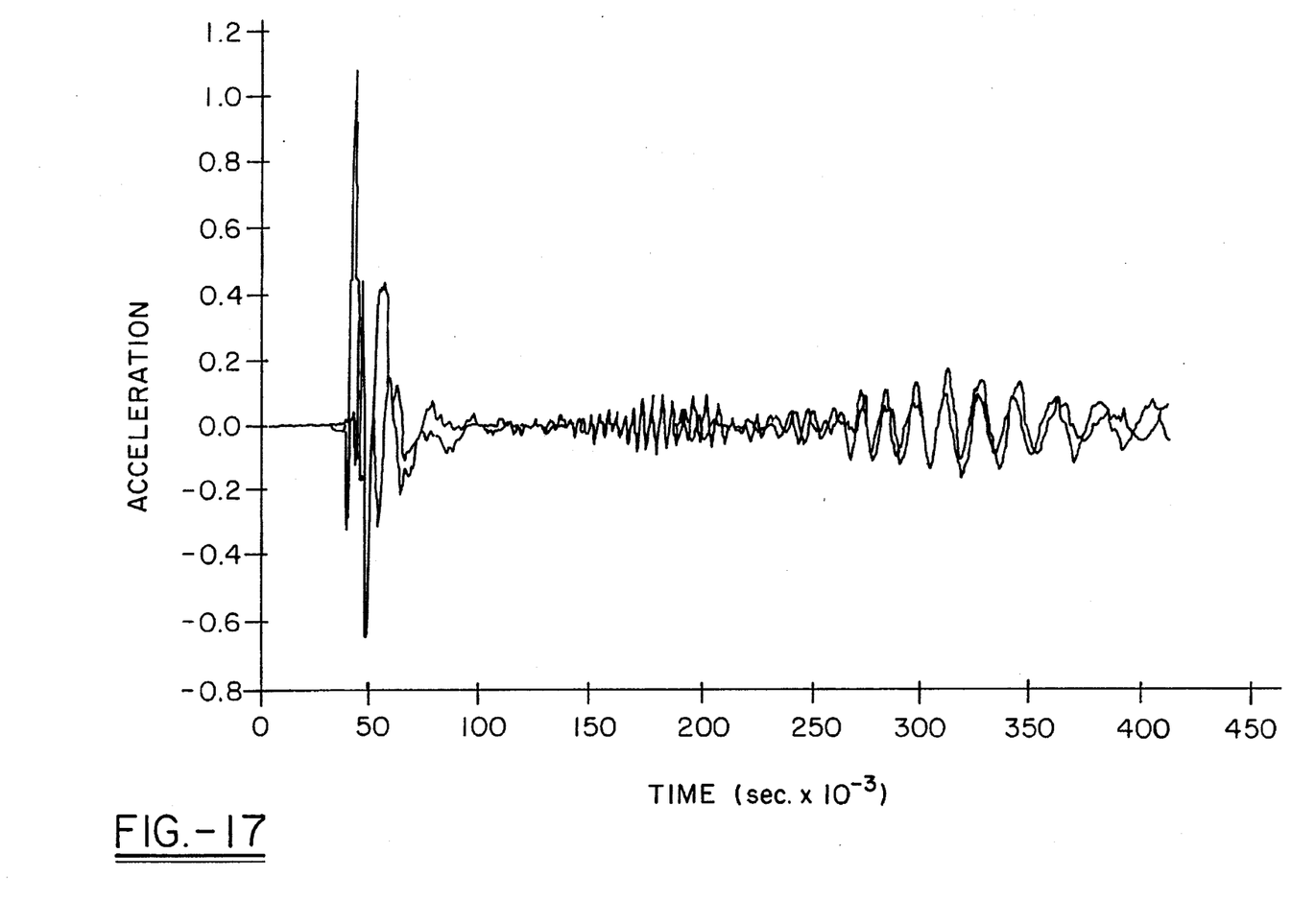
FIG. 17 is a graph of acceleration vs. time (seconds) for a 636 conductor with electric impactor, (24" impact, 5' spacing, and 1830 lbs tension).

The 636 conductor did not perform well with a close accelerometer spacing. This was due to the stiffness of the conductor and the length of the mechanical wave. Positioning of the accelerometers had to be far enough apart to be able to individually detect the passing wave, rather than "riding" the same wave. Additionally, the 636 conductor tended to quiver when the wave approached, causing inaccuracies in the time of flight calculation. This quivering was most likely due to the conductor stiffness and consisted of high frequency wave components. These various frequencies are illustrated in FIG. 17.

Thus, the device is capable of verifying that the speed of a propagating mechanical wave is proportional to the conductor tension. Additionally, this relationship appears to be consistent for a given conductor and accelerometer spacing. Further, the relationship does not appear to be influenced by conductor span.

In essence, the sonic sag tensioner calculates conductor tension based on the velocity of a mechanical wave propagating along the conductor. It can be used on electrical conductors, but additionally can be used on any cable under tension. Through the use of dual accelerometers and accompanying electronics, the amount of time taken by a mechanical wave to pass between the accelerometers will be measured (i.e., start and finish times). By comparing this time with a predefined distance separating the accelerometers, it is possible to calculate the velocity of the mechanical wave. In addition to measuring the time taken by the wave to pass between the accelerometers, it is also possible to measure the phase shift of the mechanical wave between the two accelerometers, such information potentially being used to more accurately calculate the velocity of the mechanical wave. With the additional information of the conductor skin temperature (°C. or °F.), the mechanical wave velocity is calculated which is then converted into conductor tension.

In one mode of operation of the sonic sag tensioner, an operator will input information such as the name of the conductor, or its specific weight per foot and the span length, etc., into a hand-held, possibly menu driven, microprocessor, although the requirement for being portable is simply due to operator convenience, and not by necessity. The operator would then trigger the impactor through the hand-held microprocessor through the remote control afforded to the impactor via the external BNC plug. The accelerometer sensors will then detect the time of the forward traveling wave and return the value to the microprocessor which automatically calculates the tension through preprogrammed analysis algorithms in the device. The user will have options available for the ultimate display, which would typically include at least tension and/or sag. The impactor unit mounted on the conductor will additionally be capable of measuring the conductor skin temperature which can also be displayed by the microprocessor. Communication between the land-based computer and the impactor and accelerometers, can be by such well-known modes in the art such as hard wiring, radio telemetry or fiber optic cabling.

The output from the accelerometers can be received either from a device which is capable of being permanently attached to a conductor capable of transmitting such received data to a remote site (transceivor) such as to a systems operating control center, or to a local hand-held device or microprocessor described previously.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A non-destructive method for tensioning a multi-stranded cable under tension comprising the steps of:

(a) generating a propagating vibrational wave, the wave having an induced pulse width in the cable;

(b) detecting the propagating wave with a first accelerometer positioned on the cable to detect the passage of the wave at the first accelerometer creating electrical signals having a magnitude directly proportional to the amplitude of the wave;

(c) detecting the propagating wave with a second accelerometer positioned at a distance at least one pulse width apart from the first accelerometer to detect the passage of the wave at the second accelerometer creating electrical signals having a magnitude directly proportional to the amplitude of the wave, the first and second accelerometers being attached to the cable through an attachment means which comprises:
  (i) a U-shaped clamp;
  (ii) a retaining means for securing the clamp to the cable; and
  (iii) one flat plate which serves as a rigid base for mounting the accelerometers, thereby allowing the clamp to be positioned independently of the location of the conductor strands;
(d) receiving electrical signals from the accelerometers; and
(e) processing the electrical signals to calculate the tension in the cable.

2. The process of claim 1 wherein the step of generating a propagating vibrational wave in the cable includes physically contacting the cable with an impact stimulus with a force transverse to its length, the force sufficient to produce the incident vibrational wave in the cable and propagating the wave along the length of the cable.

3. The process of claim 2 wherein the step of generating a propagating vibrational wave is by an impactor.

4. The process of claim 3 wherein the impactor is remotely activated.

5. The process of claim 4 wherein the impactor is activated via a microprocessor generated signal.

6. The process of claim 1 wherein the electrical signals from the accelerometer are received by a transceivor adjacent to the conductor which can additionally transmit such received signals to a remote location.

7. The process of claim 1 wherein the electrical signals from the accelerometers are received by a microprocessor and processed according to preprogrammed algorithms to calculate sag and tension based upon operator input and received electrical signals from the accelerometers.

8. In a process for the non-destructive tensioning of a multi-stranded cable under tension, the steps comprising generating a propagating vibrational wave, the wave having an induced pulse width in the cable; detecting the propagating wave with a first accelerometer positioned on the cable to detect the passage of the wave at the first accelerometer creating electrical signals having a magnitude directly proportional to the amplitude of the wave; detecting the propagating wave with a second accelerometer positioned at a distance at least one pulse width apart from the first accelerometer to detect the passage of the wave at the second accelerometer creating electrical signals having a magnitude directly proportional to the amplitude of the wave; receiving electrical signals from the accelerometers; and processing the electrical signals to calculate the tension in the cable, wherein the improvement results from attaching the first and second accelerometers to the cable through an attachment means which comprises:
  (a) a U-shaped clamp;
  (b) a retaining means for securing the clamp to the cable; and
  (c) one flat plate which serves as a rigid base for mounting the accelerometers, thereby allowing the clamp to be positioned independently of the location of the conductor strands.

* * * * *